US008185721B2

(12) United States Patent
Ingle et al.

(10) Patent No.: US 8,185,721 B2
(45) Date of Patent: May 22, 2012

(54) DUAL FUNCTION ADDER FOR COMPUTING A HARDWARE PREFETCH ADDRESS AND AN ARITHMETIC OPERATION VALUE

(75) Inventors: Ajay Anant Ingle, Austin, TX (US); Erich James Plondke, Austin, TX (US); Lucian Codrescu, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 619 days.

(21) Appl. No.: 12/041,694

(22) Filed: Mar. 4, 2008

(65) Prior Publication Data

US 2009/0228688 A1   Sep. 10, 2009

(51) Int. Cl.
*G06F 9/32* (2006.01)
*G06F 9/34* (2006.01)
*G06F 9/345* (2006.01)

(52) U.S. Cl. ......... 712/207; 712/205; 712/220; 712/221

(58) Field of Classification Search ................ 712/205, 712/207, 220, 221
See application file for complete search history.

(56) References Cited

U.S. PATENT DOCUMENTS

| | | | | |
|---|---|---|---|---|
| 4,827,402 A * | 5/1989 | Wada | | 712/234 |
| 4,881,170 A * | 11/1989 | Morisada | | 712/207 |
| 4,965,762 A * | 10/1990 | Williams | | 708/631 |
| 5,278,548 A * | 1/1994 | Haber | | 370/380 |
| 5,297,266 A * | 3/1994 | Tanaka | | 711/214 |
| 5,396,604 A | 3/1995 | DeLano et al. | | |
| 5,522,085 A * | 5/1996 | Harrison et al. | | 712/32 |
| 5,649,144 A * | 7/1997 | Gostin et al. | | 711/220 |
| 5,713,001 A * | 1/1998 | Eberhard et al. | | 711/216 |
| 5,778,423 A * | 7/1998 | Sites et al. | | 711/118 |
| 5,813,045 A * | 9/1998 | Mahalingaiah et al. | | 711/204 |
| 6,003,119 A * | 12/1999 | Silberman et al. | | 711/168 |
| 6,209,076 B1 * | 3/2001 | Blomgren | | 711/214 |
| 6,298,423 B1 * | 10/2001 | Johnson et al. | | 711/154 |
| 6,880,150 B1 * | 4/2005 | Takayama et al. | | 717/127 |
| 6,976,245 B2 * | 12/2005 | Takayama et al. | | 717/127 |
| 6,976,250 B2 * | 12/2005 | Takayama et al. | | 717/151 |
| 7,299,342 B2 * | 11/2007 | Nilsson et al. | | 712/222 |
| 2002/0049964 A1 * | 4/2002 | Takayama et al. | | 717/154 |
| 2002/0073407 A1 * | 6/2002 | Takayama et al. | | 717/154 |

(Continued)

FOREIGN PATENT DOCUMENTS

EP   0463976   1/1992

(Continued)

OTHER PUBLICATIONS

International Search Report—PCT/US2009/034839, International Search Authority—European Patent Office Jul. 7, 2009.

(Continued)

*Primary Examiner* — Aimee Li
(74) *Attorney, Agent, or Firm* — Peter Michael Kamarchik; Nicholas J. Pauley; Jonathan T. Velasco

(57) ABSTRACT

A system including a dual function adder is described. In one embodiment, the system includes an adder. The adder is configured for a first instruction to determine an address for a hardware prefetch if the first instruction is a hardware prefetch instruction. The adder is further configured for the first instruction to determine a value from an arithmetic operation if the first instruction is an arithmetic operation instruction.

26 Claims, 14 Drawing Sheets

U.S. PATENT DOCUMENTS

2002/0078323 A1* 6/2002 Takayama et al. ............ 712/205
2006/0271764 A1* 11/2006 Nilsson et al. .................. 712/34
2007/0198815 A1* 8/2007 Liu et al. ....................... 712/221

FOREIGN PATENT DOCUMENTS

EP 706117 A1 * 4/1996
JP 59189448 A * 10/1984

OTHER PUBLICATIONS

Written Opinion—PCT/US2009/034839, International Search Authority—European Patent Office Jul. 7, 2009.
Vandling et al: "Means for Incorporating Operand Prefetch in a Computer With a Single Alu" IP.COM Journal, IP.COM Inc., West Henrietta, NY, US. Mar. 1, 1985, XP013052774 ISSN: 1533-0001.

\* cited by examiner

US 8,185,721 B2

DUAL FUNCTION ADDER FOR COMPUTING A HARDWARE PREFETCH ADDRESS AND AN ARITHMETIC OPERATION VALUE

FIELD OF THE DISCLOSURE

Embodiments of the inventive concepts disclosed herein relate generally to the field of data processing systems. More particularly, embodiments of the inventive concepts disclosed herein relate to a dual function adder.

BACKGROUND

In some conventional computing systems, operations performed by a processor include load/store, hardware prefetch, and arithmetic operations. Load/store is the operation of loading a value from memory (e.g., Synchronous Dynamic Random Access Memory) to a register file or storing a value from a register of a register file to memory. Hardware prefetching is the preloading of data from memory into the register file in order for the data to be ready before being requested. Prefetching reduces the latency associated with memory reads because the processor does not wait for operands to be loaded if they already are preloaded into the register file. An arithmetic operation is an integer operation including, e.g., addition and subtraction between two operands.

In performing a load/store operation, the processor may compute a load/store address. The load/store address is the address of memory from which to load a value to or to which to store a value from the register file. In performing a hardware prefetch, the processor may compute a hardware prefetch address. The hardware prefetch address is the memory address from which data is to be preloaded before being requested for use in a thread execution. In performing an arithmetic operation, the processor may compute an arithmetic operation value, which is the result of an arithmetic operation (e.g., the sum of operand A plus operand B).

The prior art schematic of FIG. 1 illustrates a conventional system 100. As illustrated, the conventional system 100 may include at least three adders (106, 112, and 114) wherein one adder is for computing a load/store address (address generation adder 106), a second adder is for computing a hardware prefetch address (hardware prefetch adder 112), and a third adder is for computing an arithmetic operation value (arithmetic logic unit {ALU} adder 114). Referring to FIG. 1, the address generation adder 106 in computing a load/store address may receive a memory address operand 102 from the register file and an immediate operand 104 (e.g., a constant). An immediate operand may be a constant value listed by an operand of the operation, instead of the operand listing an address.

The adder 106 sums the memory address operand 102 and the immediate operand 104 to create the load/store address, which is sent to multiplexer 108. If a load/store operation is performed, then the multiplexer 108 sends the load/store address to multiplexer 110. On the other hand, if an arithmetic operation is being performed, then the multiplexer 108 may forward a first ALU operand 102 from the register file to the ALU adder 114 instead of forwarding the load/store address to multiplexer 108. If a hardware prefetch is to be performed in addition to or alternative to performing a load/store operation, the multiplexer 108 may forward the load/store address from the address generation adder 106 to the hardware prefetch adder 112 in order to determine a hardware prefetch address.

As illustrated in the schematic of FIG. 1, the hardware prefetch adder 112 is further configured to determine a post increment address. A post increment address is an address equaling a memory address used in a previous execution cycle plus a constant. For example, after or during execution of an operation in a current execution cycle, the address pointing, directly or indirectly, to an operand of the operation may be incremented by a constant to result in the post increment address. The post increment address may point, directly or indirectly, to an operand of an operation to be processed in a subsequent execution cycle.

In the schematic of FIG. 1, adder 112 determines a post increment address by adding the load/store address and the output of multiplexer 116, which selects the post increment constant (pconstant) 118 when computing a post increment address. The pconstant 118 may be predefined and/or hardwired or stored by the system 100. When adder 112 determines a hardware prefetch address, then the multiplexer 116 selects between a hardware prefetch decrement address 120 and a hardware prefetch increment address 122 with which to increment or decrement the load/store address. Adder 112 outputs the post increment address or hardware prefetch address 124, which may be sent to a register file the current execution cycle or the input of multiplexer 110 the next execution cycle. The hardware prefetch address 124 inputted to multiplexer 110 the next execution cycle may be used to access the data cache 136 for prefetching a value at the memory address 134. Hence, multiplexer 110 selects between the load/store address of a current execution cycle and the hardware prefetch address of the previous execution cycle depending on whether a load/store operation or a hardware prefetch is being performed.

If an arithmetic operation is to be computed, in addition to multiplexer 108 sending a first ALU operand 102 to the input of ALU adder 114, multiplexer 126 sends an output selected from a second ALU operand 128 from the register file and an Immediate ALU operand 130 (i.e., a constant) depending on the arithmetic operation. For example, an arithmetic operation may add two values stored in the register files. Hence, the input operands of the instruction may point to two registers of the register file storing the values to be added. In another example, one operand may point to a value stored in the register file while the other operand lists a predefined constant. The adder 114 then adds the output of multiplexer 126 and the ALU first operand 102 to output an arithmetic operation value 132.

One problem with system 100 is that three adders are required to process the operations, thus increasing area of the circuitry and power consumption of the processor.

SUMMARY OF THE DISCLOSURE

In an embodiment, a system including a dual function adder is described. In one embodiment, the system includes an adder. The adder is configured for a first instruction to determine an address for a hardware prefetch if the first instruction is a hardware prefetch instruction. The adder is further configured for the first instruction to determine a value from an arithmetic operation if the first instruction is an arithmetic operation instruction.

Advantages of one or more embodiments disclosed herein may include reduced area in silicon for the processor and power savings.

This illustrative embodiment is mentioned not to limit or define the inventive concepts disclosed herein, but to provide examples to aid understanding thereof. Other aspects, advantages, and features of the present disclosure will become apparent after review of the entire application, including the following sections: Brief Description of the Drawings, Detailed Description, and the Claims.

BRIEF DESCRIPTION OF THE DRAWINGS

These and other features, aspects, and advantages of the present inventive concepts disclosed herein are better understood when the following Detailed Description is read with reference to the accompanying drawings, wherein.

DETAILED DESCRIPTION

Figure 1:
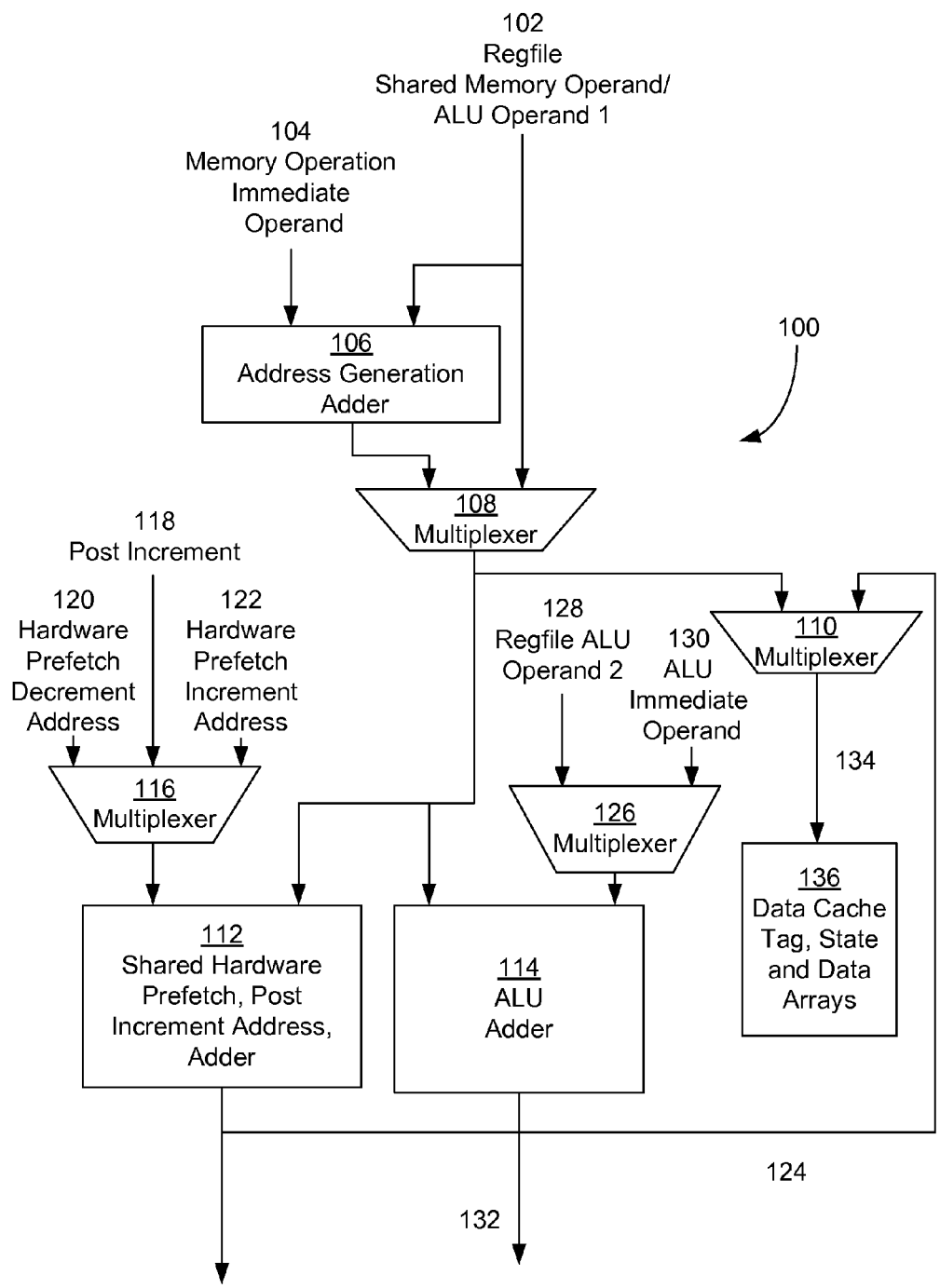
FIG. 1 is a prior art schematic illustrating a conventional circuit for computing a load/store address, a hardware prefetch address, and an arithmetic operation value.

Throughout the description, for the purposes of explanation, numerous specific details are set forth in order to provide a thorough understanding of the inventive concepts disclosed herein. It will be apparent, however, to one skilled in the art that the inventive concepts disclosed herein may be practiced without some of these specific details. In other instances, well-known structures and devices are shown in block diagram form to avoid obscuring the underlying principles of the inventive concepts disclosed herein.

Embodiments of the inventive concepts disclosed herein relate to a dual function adder. In one embodiment, the dual function adder is configured to compute hardware prefetch addresses for hardware prefetching and arithmetic operation values from executing arithmetic operations for the system in a processor. Thus, one of the adders, e.g., adders 112, 114 from FIG. 1, may be removed from the system, reducing the size and power consumption of the system. To remove an adder, the inputs to the two adders 112 and 114 are combined to be input into one adder. In one embodiment, the dual function adder is the same type of adder as one of the two conventional adders.

An advantage of sharing an adder for hardware prefetch address computation and arithmetic operation value computation is that both computations are not performed conventionally during the same execution cycle. For example, hardware prefetch conventionally occurs in execution cycles wherein no arithmetic operations are performed. As a result, an adder may perform both types of operations without creating a significant timing penalty from the dual function adder.

In addition to removing an adder from the system, in one embodiment, the system is configured to use a computed post increment address (e.g., computed by adder 112 in FIG. 1) from a previous execution cycle in a current execution cycle without requiring access to the register file to load the post increment address. Conventionally, a post increment address is stored in a register file, then retrieved at a later time. A post increment address from a previous execution cycle may point to an operand of the operation to be performed in the current execution cycle. In order to not require accessing the register file to load a previously computed post increment address, the system comprises a feedback path that is configured to input the previously computed post increment address into multiplexer 108 (FIG. 1) for use in a current execution cycle to access data cache 136. As a result, the post increment address from a previous execution cycle is available because it is input back into the system for the current execution cycle.

An advantage of using a post increment address without accessing the register file is that the time a processor would halt execution to read the register file for the post increment address is saved. Therefore, the speed of the processor comprising the system is increased.

Illustrative Embodiments of a Dual Function Adder

Figure 2:
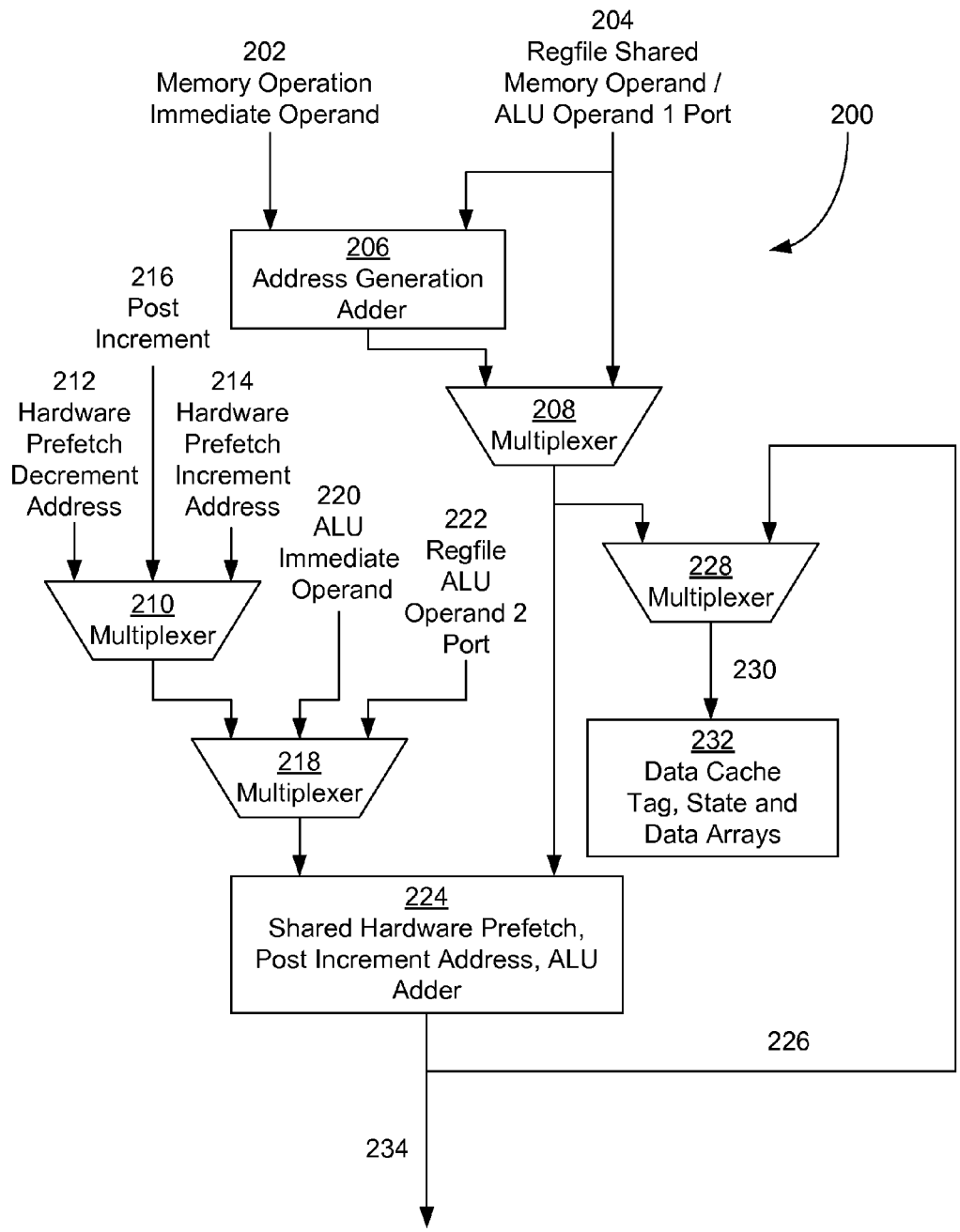
FIG. 2 is a schematic illustrating an exemplary system including a dual function adder configured to compute a hardware prefetch address and an arithmetic operation value.
Figure 3:
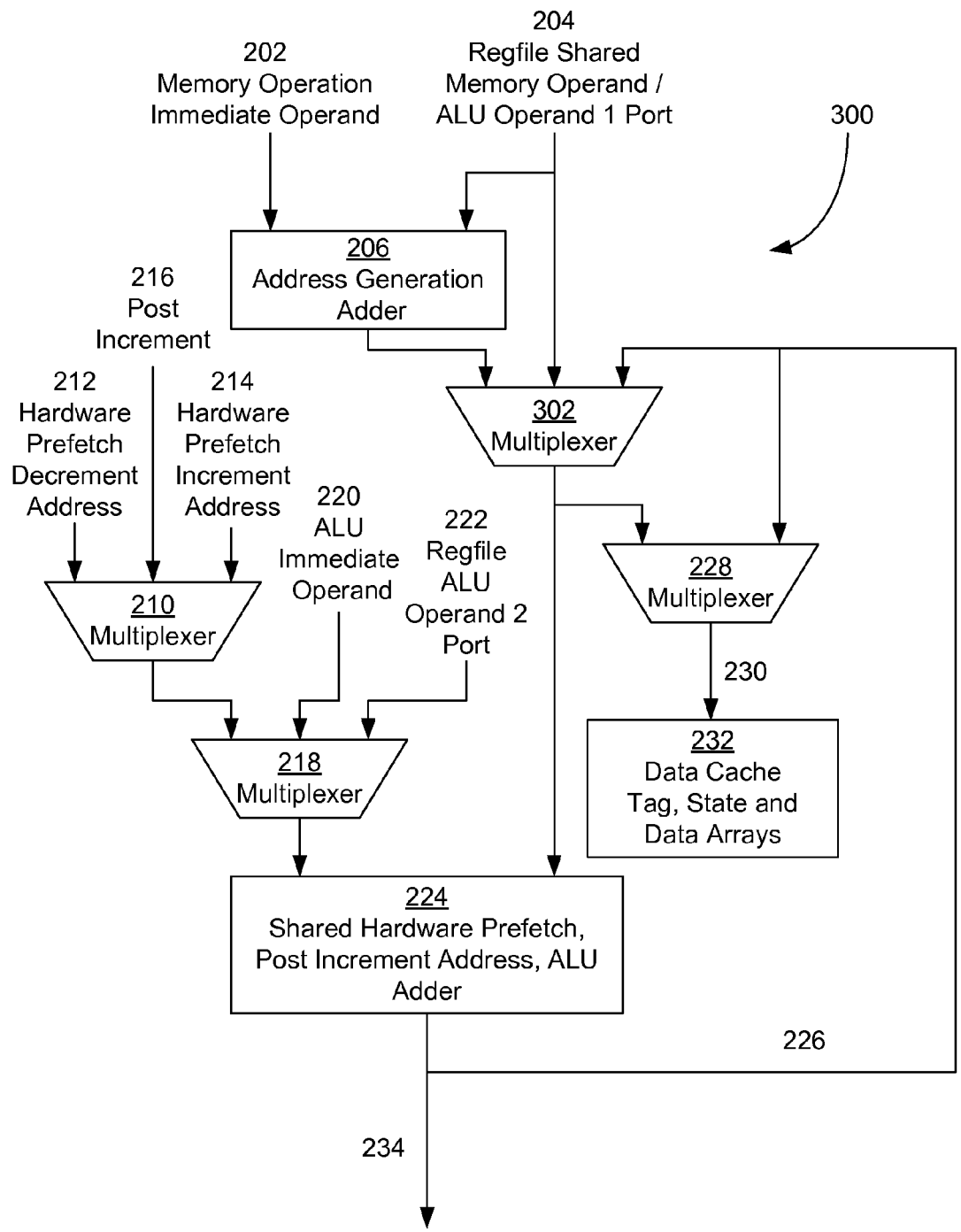
FIG. 3 is a schematic illustrating an exemplary system configured to use a post increment address computed by the dual function adder of the schematic in FIG. 2 without accessing the register file.
Figure 4:
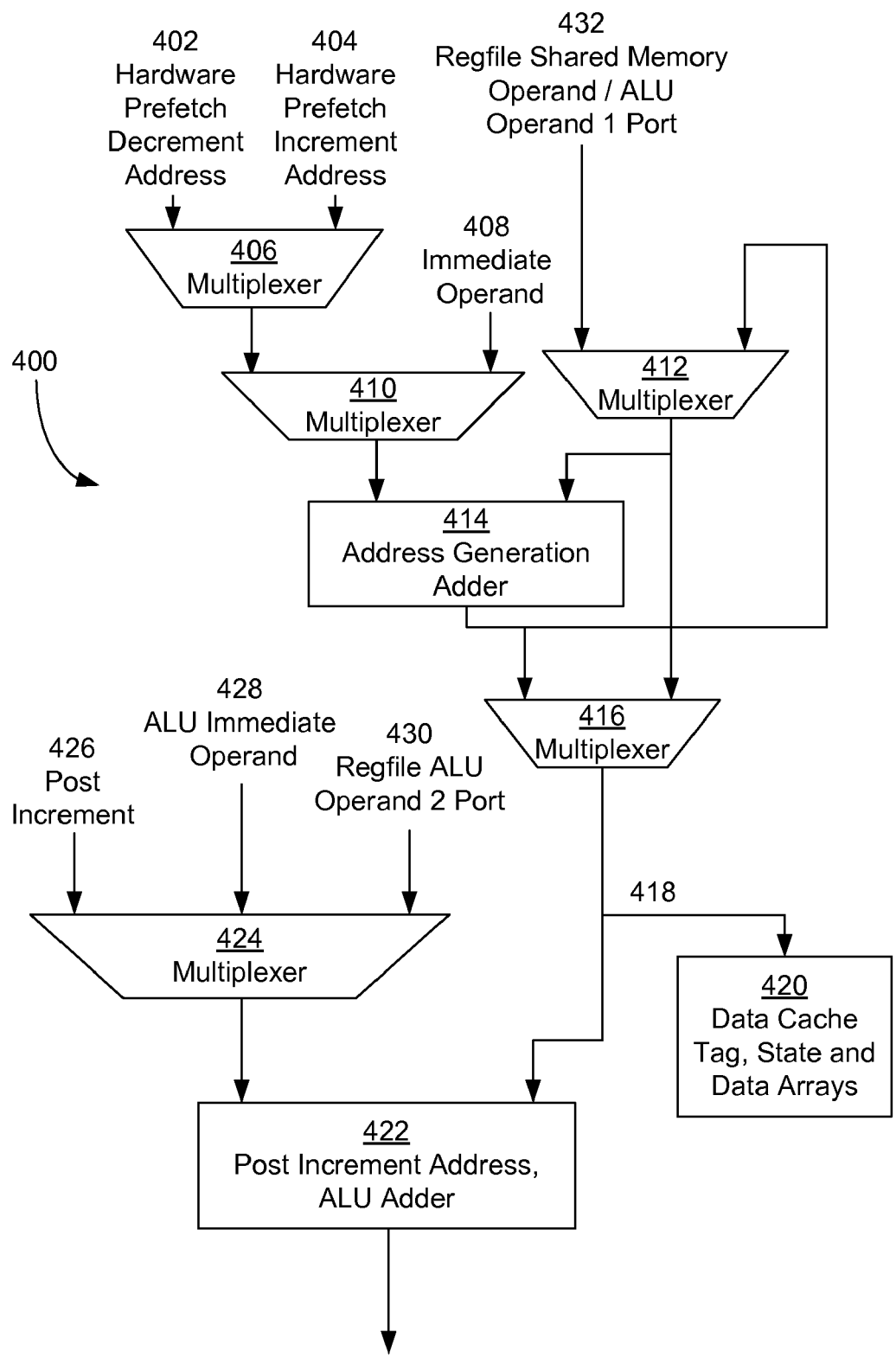
FIG. 4 is a schematic illustrating an exemplary system including a dual function adder configured to compute a hardware prefetch address and a load/store value.
Figure 5:
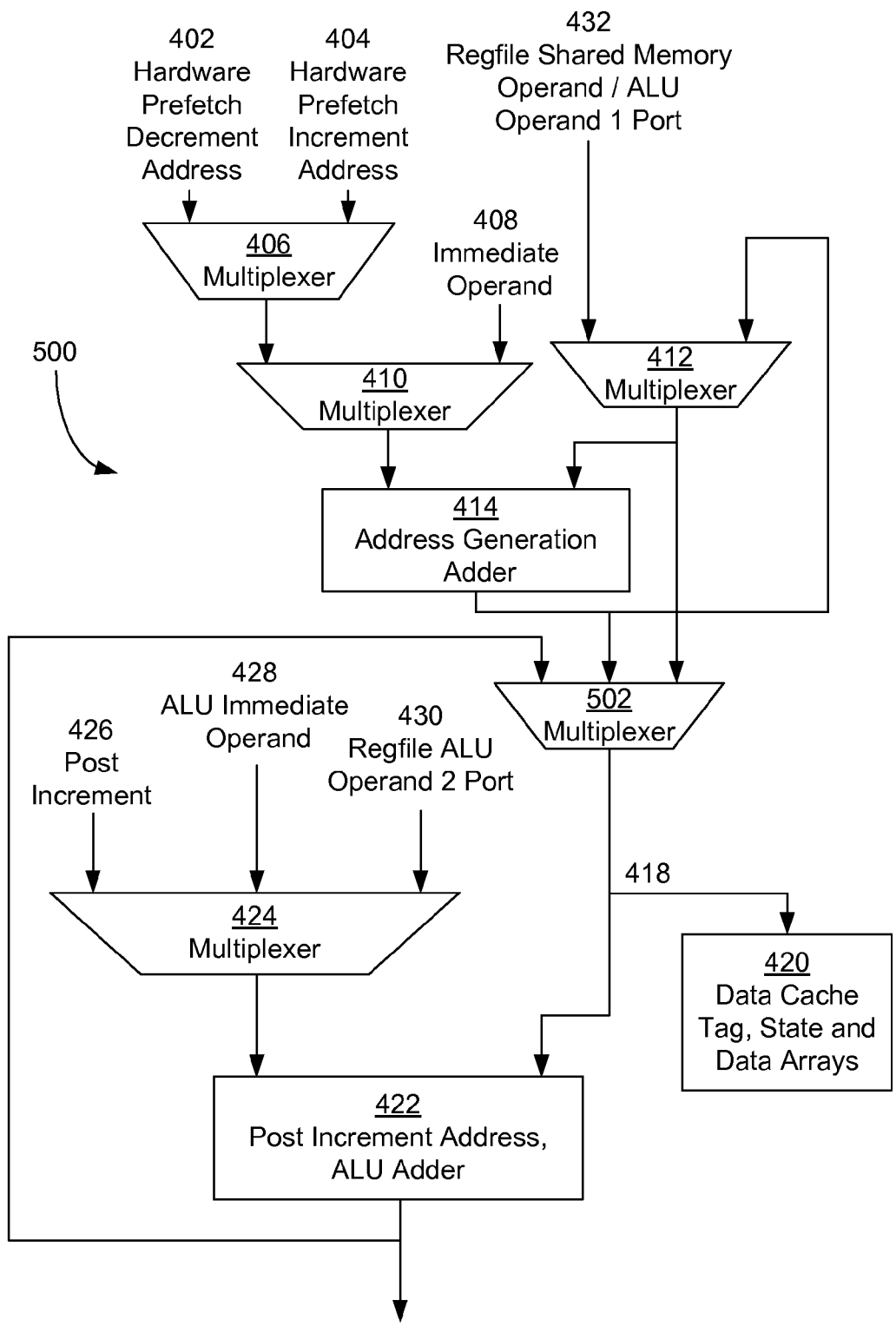
FIG. 5 is a schematic illustrating an exemplary system configured to use a post increment address computed by the dual function adder of the schematic in FIG. 4 without accessing the register file.

The schematics in FIGS. 2-5 illustrate exemplary embodiments of circuitry including a dual function adder. The schematic of FIG. 2 illustrates an exemplary system 200 including a dual function adder 224 configured to compute a hardware prefetch address 226 and compute an arithmetic operation value 226. In one embodiment, the system 200 is in the execution unit and/or load/store unit of the processor. The schematic of FIG. 3 illustrates an exemplary system 300 configured to use a post increment address computed by the dual function adder 224 without accessing the register file. The schematic of FIG. 4 illustrates an exemplary system 400 including a dual function adder 414 configured to compute a hardware prefetch address and compute a load/store address. The schematic of FIG. 5 illustrates an exemplary system 500 configured to use a post increment address computed by the adder 422 of the schematic in FIG. 4 without accessing the register file.

Referring to FIG. 2, the inputs to two separate adders (112 and 114 in FIG. 1) are combined and input into one adder 224. As illustrated by the schematic of FIG. 1, one input to both adders 112, 114 (FIG. 1) originates from multiplexer 108.

Hence, a first input to the shared adder 224 is coupled to the output of multiplexer 208. In one embodiment, multiplexer 126 (FIG. 1) is replaced with multiplexer 218 to switch between (i) the output of multiplexer 210 for hardware prefetch and post increment address computations and (ii) a second ALU operand 222 from the register file or an immediate ALU operand 220 for an arithmetic operation. The output of multiplexer 218 is coupled to the second input of the shared adder 224.

In the schematic of FIG. 2, computation of a load/store address is similar as in the schematic of FIG. 1. For computation of a hardware prefetch address by system 200, the system 200 may include multiplexer 210 configured to switch dependent on whether computing a post increment address or a hardware prefetch address. The multiplexer 218 receives the output of multiplexer 210 and is configured to switch dependent on whether a hardware prefetch/post increment address or an arithmetic operation value 234 is being computed. Computation of an arithmetic operation value by the system 200 may be computed the same as in the schematic of FIG. 1, except the multiplexer 218 that is configured to select between a second ALU operand 222 from the register file and an Immediate ALU operand 220 further receives post increment or hardware prefetch information output by the multiplexer 210 in order to output the information to shared adder 224 depending on what operation is to be performed.

Upon computing a hardware prefetch or post increment address 234, the address may be input into multiplexer 228 in a subsequent execution cycle via a feedback loop 226. The multiplexer 228 is one embodiment of control logic for selecting between a load/store address of a current execution cycle or a hardware prefetch address of a previous execution cycle in order to access the data cache 232. Other embodiments may include, but are not limited to, comparators, switches, or other digital logic for selecting between the load/store address and the hardware prefetch address.

Referring to FIG. 3, system 300 includes the dual function adder 224, as in the schematic of FIG. 2. The system 300 further includes a feedback loop 226 of the post increment address computed in a previous execution cycle to the input of multiplexer 302. In one embodiment, multiplexer 302 is configured for a third input in order to receive the post increment address 234. Hence, multiplexer 302 may be configured to select between the post increment address 234, ALU first operation 204, and the load/store address from adder 206 dependent on the operation being performed by the processor. For example, if the processor uses the post increment address to access data cache 232 for a value, then multiplexer 302 outputs the post increment address to multiplexer 228 to output memory address 230 to access the data cache 232.

Referring to FIG. 4, system 400 includes a dual function adder 414 configured to compute a hardware prefetch address and compute a load/store address. In one embodiment, multiplexer 410 selects between information to compute a load/store address (immediate operand 408) and information to compute a hardware prefetch address (the output of multiplexer 406). To compute a load/store address, multiplexer 412 outputs the memory address 432 from the register file to the dual function adder 414. Multiplexer 410 may select an immediate operand 408 for the second input into adder 414. The load/store address may then be computed by the adder 414 and output to multiplexer 416. In one embodiment, multiplexer 416 may further receive a hardware prefetch address from adder 414. Multiplexer 416 may select the load/store address when the processor is performing a load/store operation. The load/store address is then output from multiplexer 416 as the memory address 418 for accessing the data cache 420.

To compute a hardware prefetch address, a load/store address is first computed by adder 414 in a first execution cycle, then the load store address computed in the first execution cycle is selected by multiplexer 412 and input into the address generation adder 414 in the second execution cycle. The other input to the adder 414 for computing a hardware prefetch address is the hardware prefetch decrement address 402 or the hardware prefetch increment address 404. Multiplexer 406 selects between a hardware prefetch decrement address 402 and a hardware prefetch increment address 404404.

In system 400, the ALU adder 422 computes the post increment address. Hence, multiplexer 406 does not require a post increment 426 since the dual function adder 414 does not compute a post increment address. Multiplexer 410 may select the output of multiplexer 406 when adder 414 is computing a hardware prefetch address. The adder 414 then adds the increment/decrement address 402, 404 and the load/store address to create the hardware prefetch address, which is output to multiplexer 416.

Since hardware prefetch addresses and load/store addresses are calculated by the dual function adder 414 and output by multiplexer 416, a multiplexer is not required by system 400 to select between a load/store address and a hardware prefetch address. In one embodiment, the address output by the multiplexer 416 is used as memory address 418 to access data cache 420 without depending on whether the address is a hardware prefetch or load/store address.

To compute an arithmetic operation value, adder 422 may receive a first operand 432 from the register file at a first input and an immediate operand (i.e., constant) 428 or a second operand 430 from the register file at a second input. To receive the first operand 432 from the register file, multiplexer 412 outputs the operand 432 to multiplexer 416. System 400 comprises multiplexer 412 because the dual function adder 414 may receive two different types of inputs (i.e., memory operand 432 from the register file or the load/store address previously computed by the adder 414). Thus, the multiplexer 412 selects the operand (memory or ALU) 432 from the register file or the load/store address dependent on whether the system is processing (i) a load/store or arithmetic operation or (ii) a hardware prefetch.

In addition to computing an arithmetic operation value, the ALU adder 422 may further compute a post increment address. To compute a post increment address, the adder 422 may also receive a post increment 426. Therefore, multiplexer 424 selects between ALU operands 428 and 430 and post increment 426 dependent on whether the adder 422 is computing a post increment address or an arithmetic operation value.

Referring to FIG. 5, system 500 includes the dual function adder 414, as in the schematic of FIG. 4. The system 500 further includes a feedback loop for the post increment address computed by the ALU adder 422 in a previous execution cycle to the input of multiplexer 502. In one embodiment, multiplexer 502 is configured for a third input in order to receive the post increment address. Hence, multiplexer 502 is configured to select between the post increment address, memory or ALU operand 414 from the register file, and the computed load/store address depending on the operation being performed by the processor. For example, if the processor uses the post increment address to access data cache 420 for a value, then multiplexer 502 outputs the post increment address as memory address 418 to access the data cache 420.

In each of the embodiments illustrated in the schematics of FIG. 2-5, the systems comprising two adders, wherein one is a dual function adder, are configured to compute a hardware prefetch address, a load/store address, and a value from an arithmetic operation. The schematics of FIG. 2-5 have been described in relation to a singlethread processor architecture, but may be used in a multi-thread processor, as described below.

Operation of the Illustrative Embodiments in a Multi-thread Processor

Figure 6:
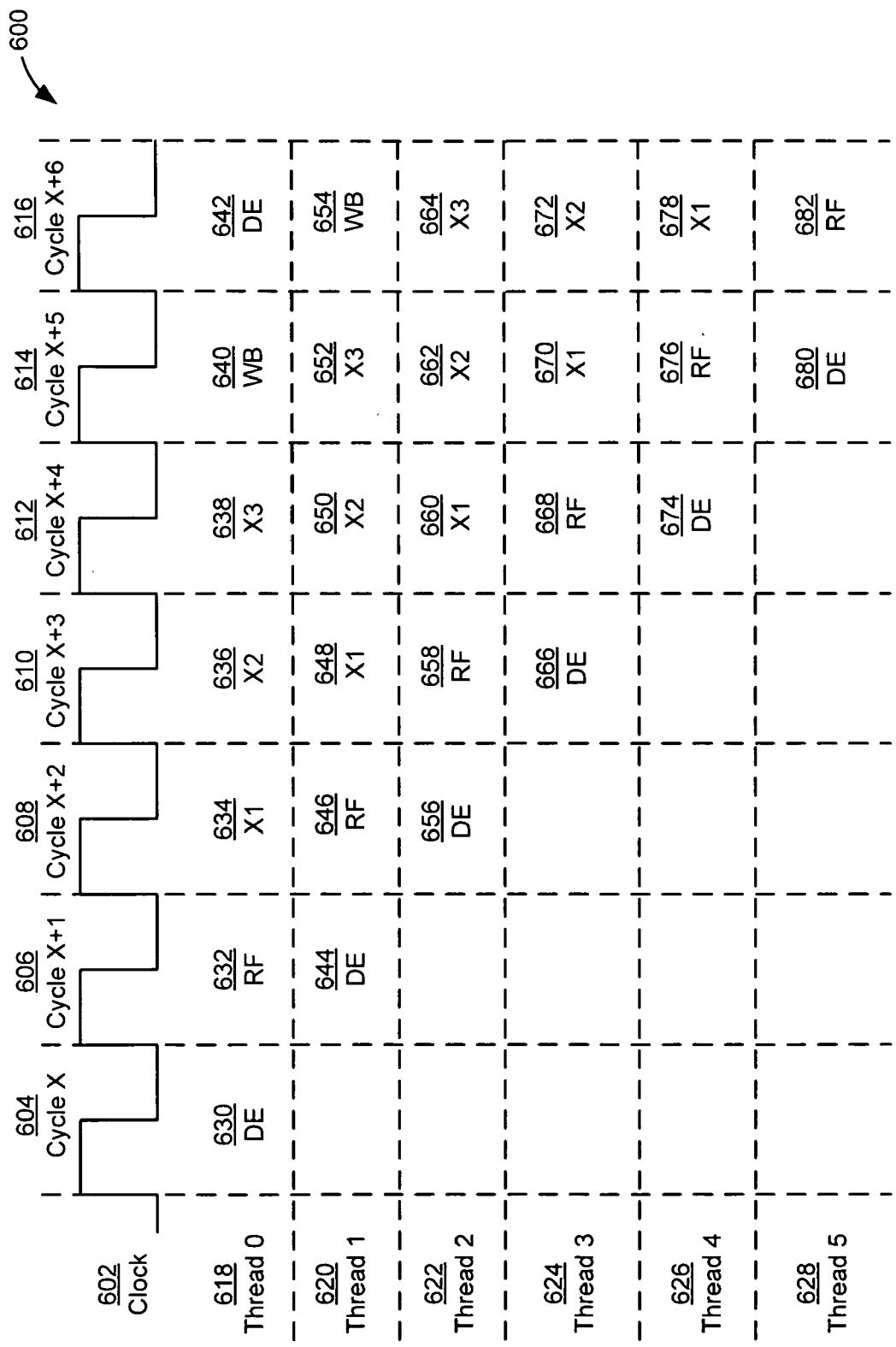
FIG. 6 is a diagram illustrating an instruction pipeline for a multi-thread processor.

In an exemplary embodiment, the systems 200, 300, 400, 500 illustrated in the schematics of FIGS. 2-5 may operate in a multi-thread processor architecture. FIG. 6 is a diagram illustrating an instruction pipeline 600 for a multi-thread processor. Referring to FIG. 6, the diagram illustrates the pipeline 600 over clock 602 cycles X through X+6 (604-616) for six threads 618-628. In the example, processing of an instruction (i.e., an instruction cycle) is broken into six operation cycles: decode (DE), register file access (RF), first execution cycle (X1), second execution cycle (X2), third execution cycle (X3), and write back (WB). Another operation cycle in the pipeline that may exist but is not shown is fetch. In the example, each operation cycle may be performed in one clock cycle.

In one embodiment, one instruction cycle is the time to complete each of the operation cycles for one instruction. For example, one instruction cycle for thread 0 618 may be clock cycles X (604) through X+5 (614), or six clock cycles. If the pipeline included a fetch operation cycle, then the instruction cycle may be seven clock cycles. Thus, for systems 200-300 (FIGS. 2-3), one instruction cycle may include each of the operation cycles of the pipeline, such as decode (DE), register file access (RF), first execution cycle (X1), second execution cycle (X2), third execution cycle (X3), and write back (WB).

In describing the operation cycles included in an instruction cycle for an example load instruction, the fetch operation cycle (not shown) may be a pipeline operation cycle wherein the processor retrieves and loads an instruction for execution. For example, in reference to systems 200 and 300 illustrated in the schematics of FIGS. 2-3, an example instruction of thread 0 618 to perform a load of memory address A plus some constant may be fetched in order to be executed by the processor. DE (630, 644, 656, 666, 674, 680) is the operation cycle wherein the processor decodes the load instruction into operands. Hence, in the previous load instruction example, the processor decodes during DE 630 the instruction to gather the immediate operand and/or the register file address of the register file storing an operand. RF (632, 646, 658, 668, 676, 682) is the operation cycle wherein the processor retrieves the operands from the register file. Hence, the processor may retrieve the memory operand 204 (FIGS. 2-3) from the register file.

X1, X2, and X3 (634-638, 648-2652, 660-664, 670-672, 678) are the operation cycles wherein the processor completes a first portion, a second portion, and a third portion, respectively, of execution of the instruction. For the load operation instruction, operation cycle X1 634 may include computing the load/store address by the address generation adder 206 (FIGS. 2-3). Operation cycle X2 636 may include the selection of the load/store address by multiplexer 208, 302 and multiplexer 228 (FIGS. 2-3) as the memory address 230 for accessing the data cache 232 (FIGS. 2-3). X3 638 may include accessing the data cache 232 to perform the load. WB (640, 654) is the operation cycle wherein an operand may be written back to the register file. For example, if a post increment address or an arithmetic operation value is computed, the post increment address or arithmetic operation value is written to the register file during pipeline operation cycle WB. For a load instruction, the processor may not writeback a value to the register file during WB for the instruction.

Referring again to the schematics of FIGS. 2-3 and the pipeline 600 illustrated in the diagram of FIG. 6, the address generation adder 206 may operate during pipeline operation cycle X1, the multiplexers 208, 210, 218, 228, and 302 may operate during pipeline operation cycle X2, and adder 224 may operate and data cache 232 may be accessed during pipeline operation cycle X3. For example in system 200 (FIG. 2), to calculate a hardware prefetch address, a load/store address is calculated by adder 206 during pipeline operation cycle X1, the load/store address is sent to a first input of the adder 224 by multiplexer 208 during pipeline operation cycle X2, the hardware prefetch decrement address 212 or the hardware prefetch increment address 214 is sent to a second input of the adder 224 by multiplexers 210, 218 also during pipeline operation cycle X2, and the hardware prefetch address is computed by the adder 224 during pipeline operation cycle X3.

In a multi-thread architecture, different pipeline operation cycles may be performed concurrently on instructions from different threads. As illustrated, during clock cycle X+2 608, thread 0 618 may be in operation cycle X1 634, thread 1 620 may be in operation cycle RF 646, and thread 2 622 may be in operation cycle DE 656. As a result, data for multiple threads may be in the systems 200, 300, 400, 500 at one time. Since data may persist from one operation cycle to another for a single thread (e.g., a hardware prefetch address or post increment address may be input back into the system in the next operation cycle) and multiple data from different threads may co-exist in the system, the systems 200, 300, 400, 500 may include temporary storage in different locations of the system in order to store values of a thread until the next execution cycle of the thread. For example, a hardware prefetch address computed in thread 0 by adder 224 in the schematic of FIG. 3 during operation cycle X3 638 (clock cycle X+4 612) may be stored until the next operation cycle X2 (e.g., clock cycle X+9) when multiplexer 228 may select the hardware prefetch address to access the data cache 136. In one embodiment, flip-flops are inserted into the system and configured to store values for a predetermined number of clock cycles (e.g., storing a hardware prefetch address for five clock cycles). Other embodiments of storage include buffers, memories, or other storage devices.

As a result, the exemplary embodiments of the systems illustrated in the schematics of FIGS. 2-5 may be configured to execute in a single-thread architecture and a multi-thread architecture.

Exemplary Methods of Operation of the Illustrative Embodiments

Figure 7:
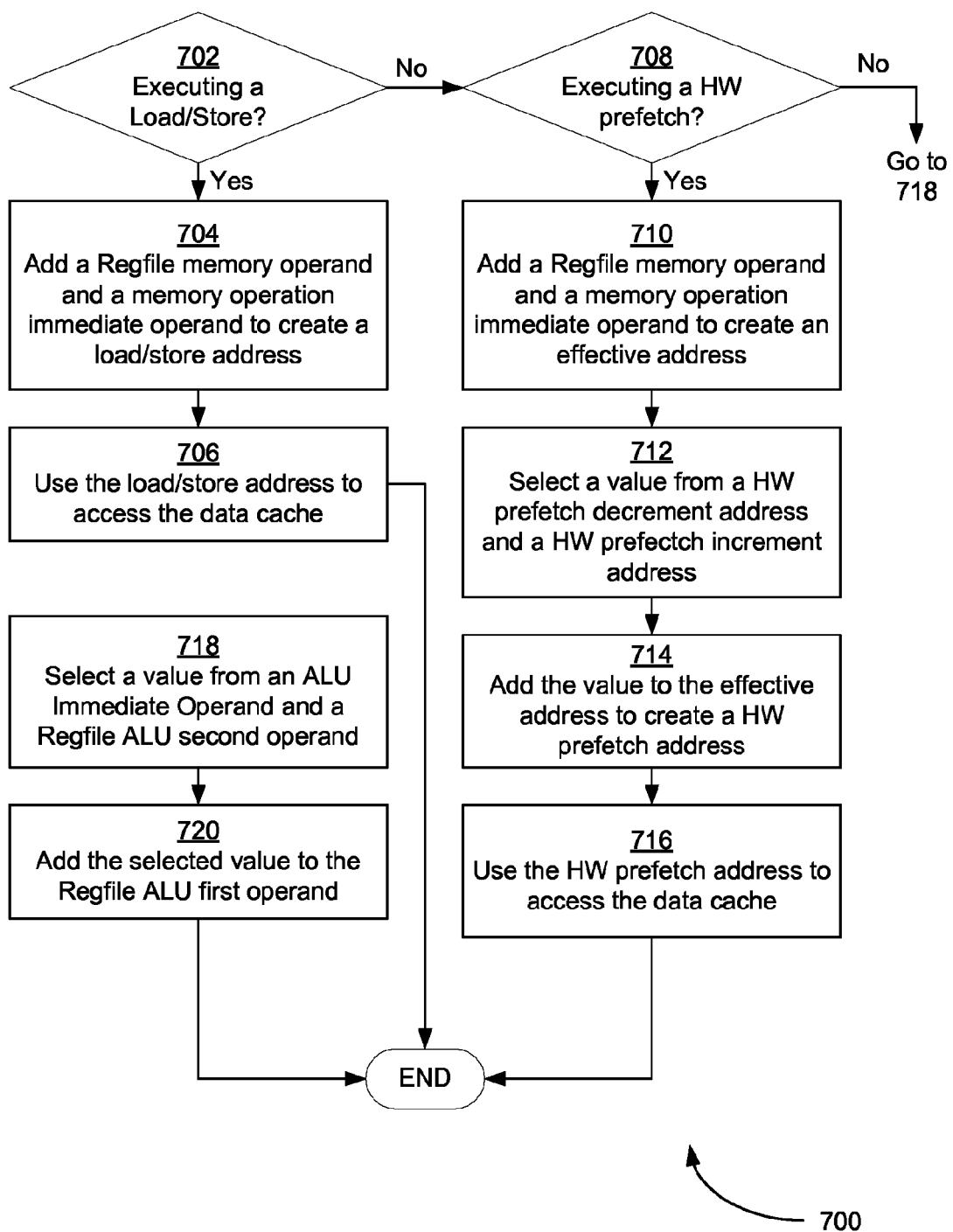
FIG. 7 is a flowchart illustrating an exemplary method for executing a hardware prefetch, a load/store, or an arithmetic operation by the systems illustrated in the schematics of FIGS. 2 and 3.
Figure 8:
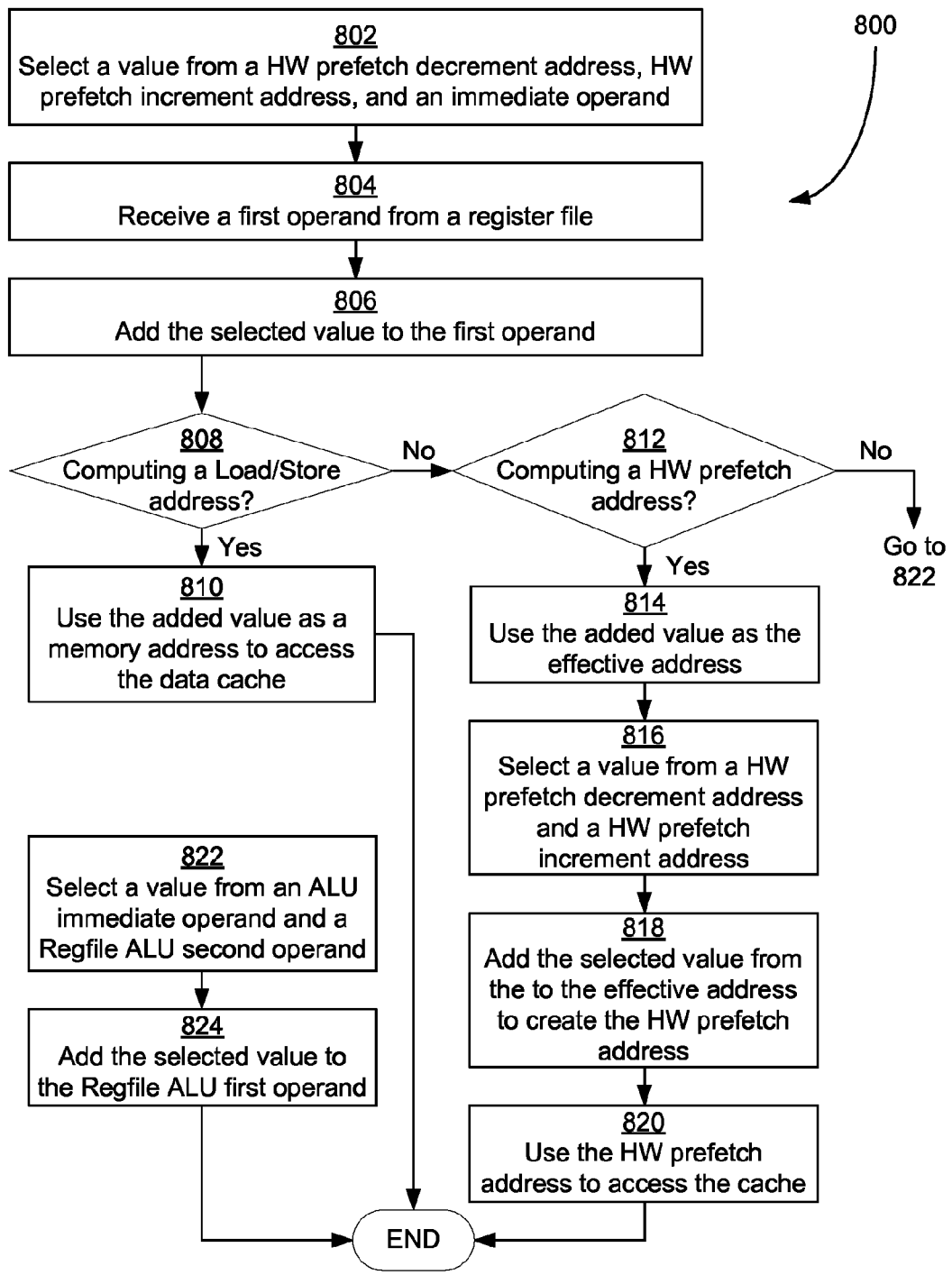
FIG. 8 is a flowchart illustrating an exemplary method for executing a hardware prefetch, a load/store, or an arithmetic operation by the system illustrated in the schematics of FIGS. 4 and 5.
Figure 9:
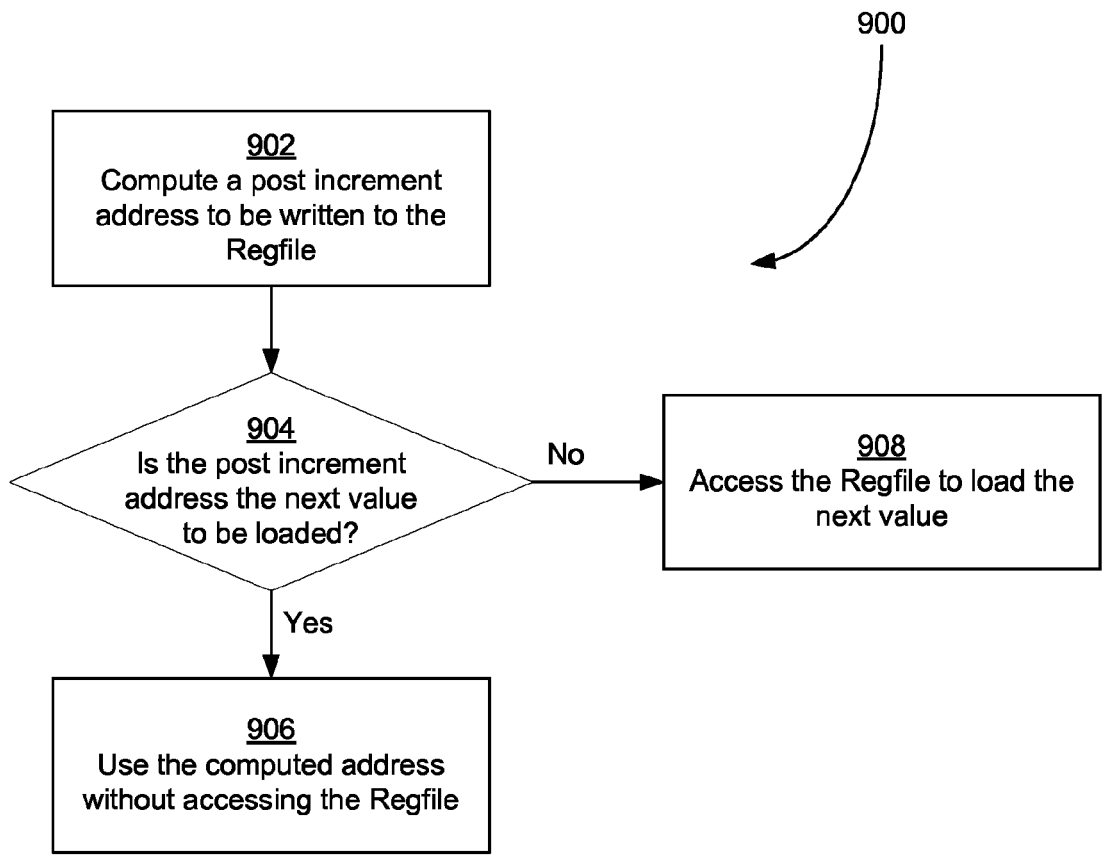
FIG. 9 is a flowchart illustrating an exemplary method for computing and using a post increment address by the system illustrated in the schematics of FIGS. 3 and 5.

FIGS. 7-9 are flowcharts illustrating exemplary methods of operation of systems 200, 300, 400, 500 illustrated in the schematics of FIGS. 2-5. The flowchart of FIG. 7 illustrates an exemplary method 700 for executing a hardware prefetch, a load/store, or an arithmetic operation by the system 200, 300 illustrated in the schematics of FIGS. 2 and 3. The flowchart of FIG. 8 illustrates an exemplary method 800 for executing a hardware prefetch, a load/store, or an arithmetic operation by the system 400, 500 illustrated in the schematics of FIGS. 4 and 5. The flowchart of FIG. 9 illustrates an exemplary method 900 for computing and using a post increment address by the system 300, 500 illustrated in the schematics of FIGS. 3 and 5.

Referring to FIG. 7, the flowchart illustrates a method 700 wherein the hardware prefetch address and the arithmetic operation value are computed by a dual function adder 224 (FIG. 2-3). Beginning at 702, the processor determines if a load/store operation is to be executed. If a load/store operation is to be executed, then the adder 206 computes a load/store address in 704 by adding the memory operand 204 from the register file to the immediate operand 220. Upon computing the load/store address in 704, the multiplexers 208 and 228 (FIG. 2) or 302 and 228 (FIG. 3) select the load/store address as memory address 230 in accessing the data cache 232 in 706.

If the processor determines that a load/store is not to be executed in 702, then the processor determines if a hardware prefetch is to be executed in 708. If a hardware prefetch is to be executed, the adder 206 computes the load/store address in 710 by adding the memory operand 204 from the register file to the immediate operand 204. Upon computing the load/store address, the multiplexers 210 and 218 select a hardware prefetch decrement address 212 or a hardware prefetch increment address 214 to be added to the computed load/store address in 712. Proceeding to 714, the dual function adder 224 adds the selected value from 712 to the load/store address to create the hardware prefetch address. Upon computing the hardware prefetch address in 714, the multiplexer 228 may select the hardware prefetch address to access the data cache 232 in 716. As previously stated, the selection of the hardware prefetch address by the multiplexer 228 and continuing execution of a hardware prefetch may be performed in a subsequent execution cycle.

If the processor determines that a hardware prefetch is not to be executed in 708, then process flows to 718. In 718, multiplexer 218 selects from a second ALU operand 222 from the register file or an Immediate ALU operand 220. In one embodiment, the operation lists whether the operand is to be retrieved from a register file (e.g., by listing a register file address for the operand) or is a constant (e.g., the operand is a constant, not a register file address). The multiplexer 208 selects a first ALU operand 204 from the register file. Upon selecting the different operands to be added for the arithmetic operation, the dual function adder 224 adds the selected operand from multiplexer 218 to the operand 204 from the register file in 720 to execute the arithmetic operation and create an arithmetic operation value.

Referring to FIG. 8, the flowchart illustrates a method 800 wherein the hardware prefetch address and the load/store address are computed by a dual function adder 414 (FIG. 4-5). Beginning at 802, the processor determines if a load/store operation is to be executed. If a load/store operation is to be executed, then the multiplexer 412 selects a memory operand 432 from the register file and the multiplexer 410 selects an immediate operand 428 in 804. Proceeding to 806, the dual function adder 414 adds the outputs of the multiplexers 412 and 410 (the memory operand 432 and immediate operand 428, respectively) to create the load/store address. Upon computing the load/store address in 806, the multiplexer 416 (FIG. 4) or 502 (FIG. 5) selects the load/store address as memory address 418 in accessing the data cache 420 in 808.

If the processor determines that a load/store is not to be executed in 802, then the processor determines if a hardware prefetch is to be executed in 810. If a hardware prefetch is to be executed, then the multiplexer 412 selects a memory operand 432 from the register file and the multiplexer 410 selects an immediate operand 428 in 812. Proceeding to 814, the dual function adder 414 adds the outputs of the multiplexers 412 and 410 (the memory operand 432 and immediate operand 428, respectively) to create the load/store address. Upon computing the load/store address, the multiplexers 406 and 410 select a hardware prefetch decrement address 402 or a hardware prefetch increment address 404 to be added to the computed load/store address in 816. In one embodiment, the multiplexer 412 selects the computed load/store address. The selection of the load/store address by the multiplexer 412 after computation of the load/store address and continuing execution of a hardware prefetch may be performed in a subsequent execution cycle. Proceeding to 818, the dual function adder 414 adds the selected hardware increment/decrement address from 816 to the load/store address to create the hardware prefetch address. Upon computing the hardware prefetch address in 818, the multiplexer 416 (FIG. 4) or 502 (FIG. 5) may select the hardware prefetch address to access the data cache 420 in 820.

If the processor determines that a hardware prefetch is not to be executed in 810, then process flows to 822. In 822, multiplexer 424 selects from a second ALU operand 128 from the register file or an Immediate ALU operand 130. In one embodiment, the operation lists whether the operand is to be retrieved from a register file (e.g., by listing a register file address for the operand) or is a constant (e.g., the operand is a constant, not a register file address). The multiplexers 412 and 416 (FIG. 4) or 502 (FIG. 5) select a first ALU operand 102 from the register file. Upon selecting the different operands to be added for the arithmetic operation, the ALU adder 422 adds the selected operand from multiplexer 424 to the operand 102 from the register file in 824 to execute the arithmetic operation and create an arithmetic operation value.

Referring to FIG. 9, the flowchart illustrates a method 900 wherein the systems 300 (FIG. 3) and 500 (FIG. 5) include a feedback loop for a post increment address in order to compute and use a post increment address without accessing a register file to read the post increment address. Beginning at 902, adder 224 (FIG. 3) or 422 (FIG. 5) computes a post increment address to be written to a register file. The processor may then store the computed post increment address in the register file. Upon computing a post increment address, the processor determines if the post increment address points to a value to be loaded from memory or to be used in a subsequent execution cycle in 904. For example, if the post increment address points in memory to an input operand for a subsequent instruction, then the input operand is a value to be loaded for use during a subsequent execution cycle.

If the post increment address points to an operand to be loaded, then the computed post increment address is used to access the data cache 232 (FIG. 3) or 420 (FIG. 5) without accessing the register file in 906. Hence, the processor skips reading the post increment address from the register file by using the post increment address persisted in the system 300 or 500. For system 300 (FIG. 3), the post increment address computed during a previous execution cycle by adder 224 is inputted into multiplexer 302 for selection by multiplexers 302 and 228 to access the data cache 232 to retrieve the wanted operand. For system 500 (FIG. 5), the post increment address computed by adder 422 during a previous execution cycle is inputted into multiplexer 502 for selection by multiplexer 502 to access the data cache 420 to retrieve the wanted operand.

If the computed post increment address does not point to an operand to be loaded in 904, then the system 300 (FIG. 3) or 500 (FIG. 5) do not need the post increment address in the next execution cycle and thus access the register file for the wanted operand depending on the type of operation to be performed.

Example Devices Including the Above Described Features

Systems including dual function adders and post increment address feedback loops may be included in any processor, such as digital signal processors. The general diagrams of FIGS. 10-14 illustrate example devices that may incorporate a dual function adder and/or a post increment feedback loop to assist in executing load/store operations and hardware prefetch, hardware prefetch and arithmetic operations, or using post increment addresses without accessing the register file of the processor. The diagrams are illustrates as including a dual function adder in a processor of the example devices.

Figure 10:
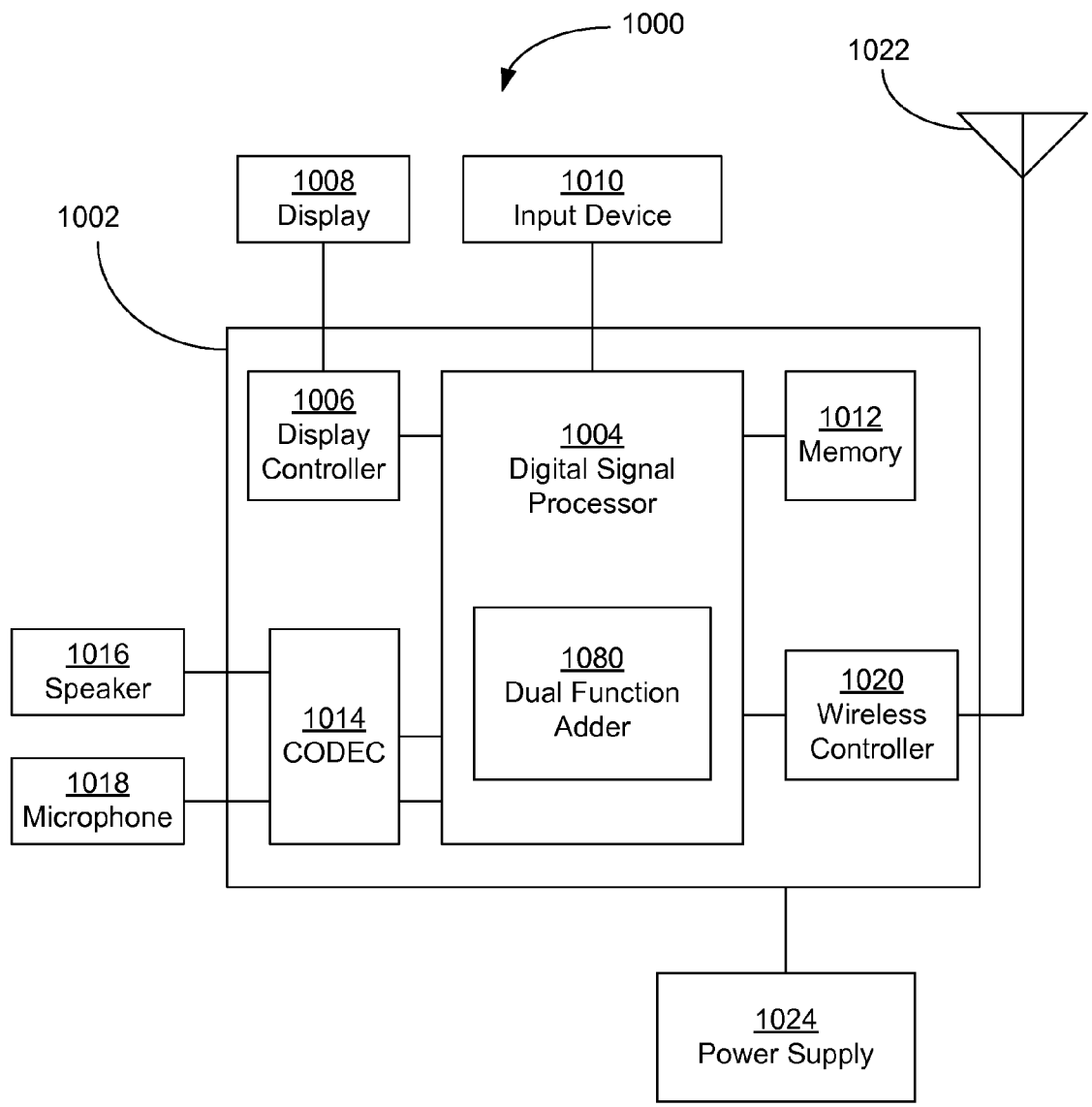
FIG. 10 is a general diagram illustrating an example portable communication device incorporating a digital signal processor that may include a dual function adder.

FIG. 10 is a diagram illustrating an exemplary embodiment of a portable communication device 1000. As illustrated in the general diagram of FIG. 10, the portable communication device includes an on-chip system 1002 that includes a digital signal processor (DSP) 1004. The general diagram of FIG. 10 also shows a display controller 1006 that is coupled to the digital signal processor 1004 and a display 1008. Moreover, an input device 1010 is coupled to the DSP 1004. As shown, a memory 1012 is coupled to the DSP 1004. Additionally, a coder/decoder (CODEC) 1014 may be coupled to the DSP 1004. A speaker 1016 and a microphone 1018 may be coupled to the CODEC 1014.

The general diagram of FIG. 10 further illustrates a wireless controller 1020 coupled to the digital signal processor 1004 and a wireless antenna 1022. In a particular embodiment, a power supply 1024 is coupled to the on-chip system 602. Moreover, in a particular embodiment, as illustrated in FIG. 6, the display 626, the input device 630, the speaker 1016, the microphone 1018, the wireless antenna 1022, and the power supply 1024 are external to the on-chip system 1002. However, each is coupled to a component of the on-chip system 1002. In a particular embodiment, the DSP 1004 includes a dual function adder 1080 to compute both hardware prefetch addresses and arithmetic operation values or both hardware prefetch addresses and load/store addresses, as previously described.

Figure 11:
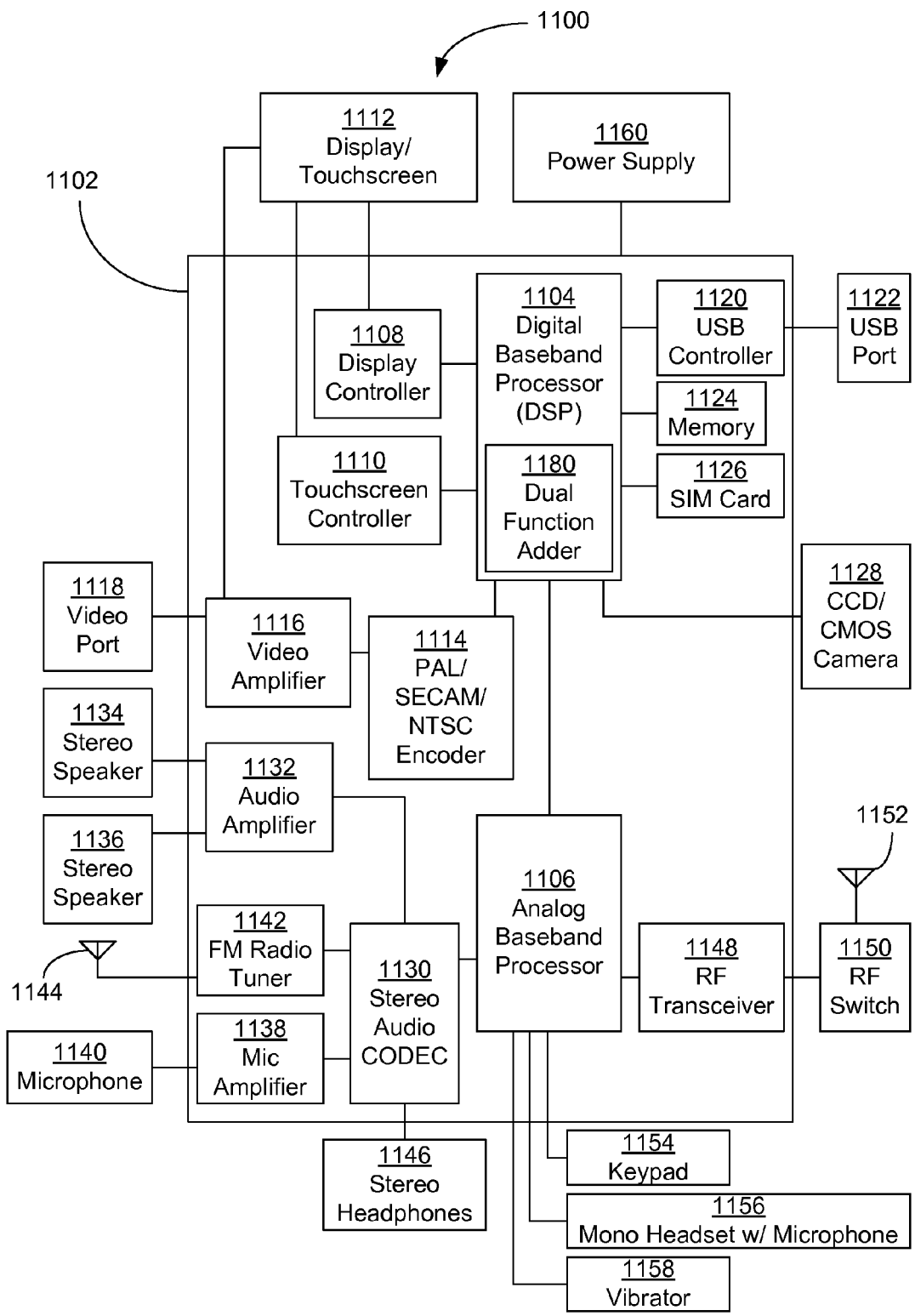
FIG. 11 is a general diagram illustrating an example cellular telephone incorporating a digital signal processor that may include a dual function adder.

FIG. 11 is a diagram illustrating an exemplary embodiment of a cellular telephone 1100. As shown, the cellular telephone 1100 includes an on-chip system 1102 that includes a digital baseband processor 1104 and an analog baseband processor 1106 that are coupled together. In a particular embodiment, the digital baseband processor 1104 is a digital signal processor. As illustrated in the general diagram of FIG. 11, a display controller 1108 and a touchscreen controller 1110 are coupled to the digital baseband processor 11104. In turn, a touchscreen display 1112 external to the on-chip system 1102 is coupled to the display controller 1108 and the touchscreen controller 1110.

The general diagram of FIG. 11 further illustrates a video encoder 1114, e.g., a phase alternating line (PAL) encoder, a sequential couleur a memoire (SECAM) encoder, or a national television system(s) committee (NTSC) encoder, is coupled to the digital baseband processor 1104. Further, a video amplifier 1116 is coupled to the video encoder 1114 and the touchscreen display 1112. Also, a video port 1118 is coupled to the video amplifier 1116. As depicted in the general diagram of FIG. 11, a universal serial bus (USB) controller 1120 is coupled to the digital baseband processor 11104. Also, a USB port 1122 is coupled to the USB controller 1120. A memory 1124 and a subscriber identity module (SIM) card 1126 may also be coupled to the digital baseband processor 1104. Further, as shown in the general diagram of FIG. 11, a digital camera 1128 may be coupled to the digital baseband processor 1104. In an exemplary embodiment, the digital camera 1128 is a charge-coupled device (CCD) camera or a complementary metal-oxide semiconductor (CMOS) camera.

As further illustrated in the general diagram of FIG. 11, a stereo audio CODEC 1130 may be coupled to the analog baseband processor 1106. Moreover, an audio amplifier 1132 may coupled to the to the stereo audio CODEC 1130. In an exemplary embodiment, a first stereo speaker 1134 and a second stereo speaker 1136 are coupled to the audio amplifier 1132. A microphone amplifier 1138 may be also coupled to the stereo audio CODEC 1130. Additionally, a microphone 1140 may be coupled to the microphone amplifier 1138. In a particular embodiment, a frequency modulation (FM) radio tuner 1142 may be coupled to the stereo audio CODEC 1130. Also, an FM antenna 1144 is coupled to the FM radio tuner 1142. Further, stereo headphones 1146 may be coupled to the stereo audio CODEC 1130.

The general diagram of FIG. 11 further illustrates a radio frequency (RF) transceiver 1148 may be coupled to the analog baseband processor 1106. An RF switch 1150 may be coupled to the RF transceiver 1148 and an RF antenna 1152. A keypad 1154 may be coupled to the analog baseband processor 1106. Also, a mono headset with a microphone 1156 may be coupled to the analog baseband processor 1106. Further, a vibrator device 1158 may be coupled to the analog baseband processor 1106. The general diagram of FIG. 11 also shows a power supply 1160 may be coupled to the on-chip system 1102. In a particular embodiment, the power supply 1160 is a direct current (DC) power supply that provides power to the various components of the cellular telephone 1100. Further, in a particular embodiment, the power supply is a rechargeable DC battery or a DC power supply that is derived from an alternating current (AC) to DC transformer that is coupled to an AC power source.

As depicted in the general diagram of FIG. 11, the touchscreen display 1112, the video port 1118, the USB port 1122, the camera 1128, the first stereo speaker 1134, the second stereo speaker 1136, the microphone 1140, the FM antenna 1144, the stereo headphones 1146, the RF switch 1150, the RF antenna 1152, the keypad 1154, the mono headset 1156, the vibrator 1158, and the power supply 1160 may be external to the on-chip system 1102. In a particular embodiment, the digital baseband processor 1104 includes a dual function adder 1180 to compute both hardware prefetch addresses and arithmetic operation values or both hardware prefetch addresses and load/store addresses, as previously described.

Figure 12:
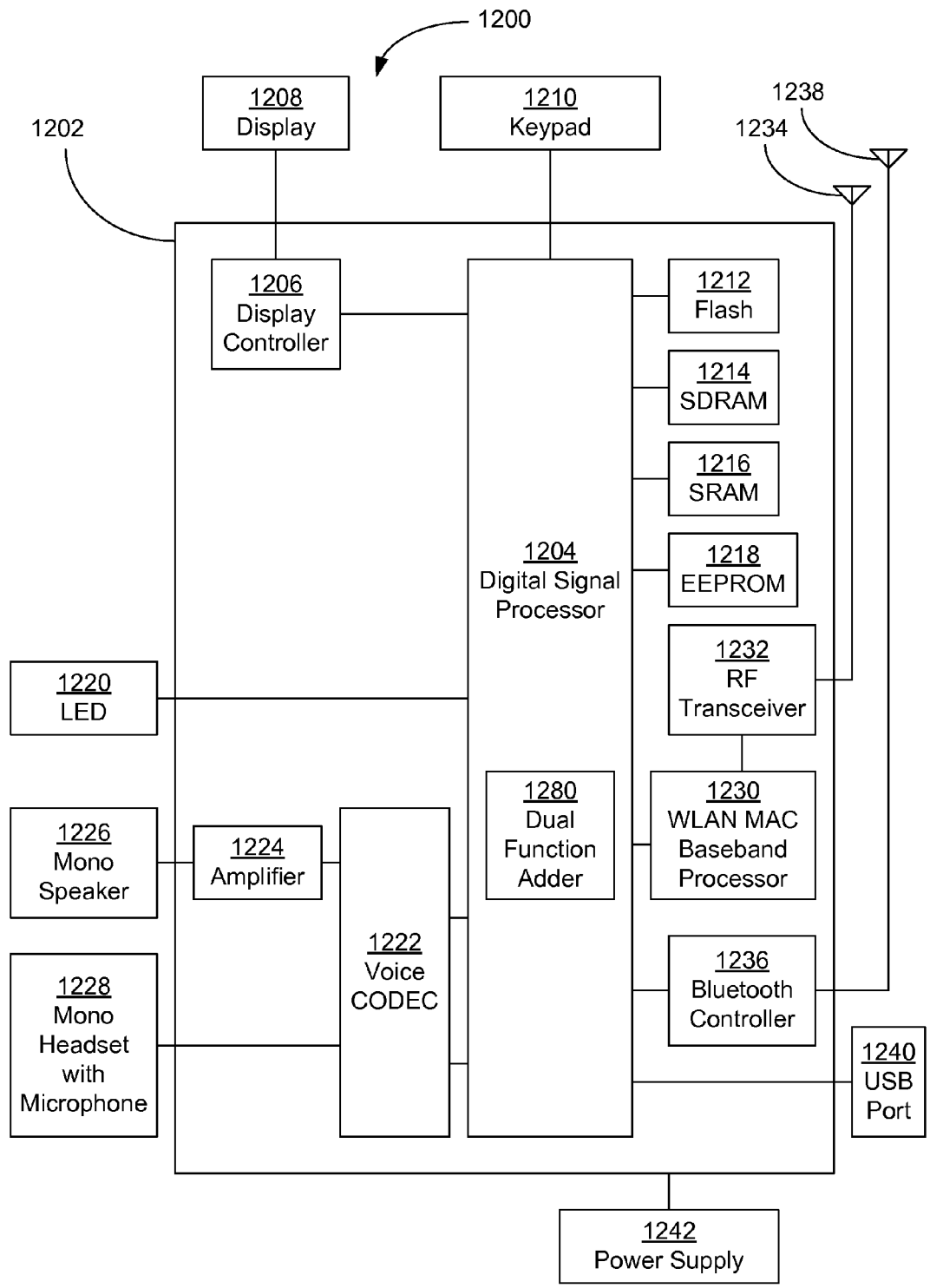
FIG. 12 is a general diagram illustrating an example wireless Internet Protocol telephone incorporating a digital signal processor that may include a dual function adder.

FIG. 12 is a diagram illustrating an exemplary embodiment of a wireless Internet protocol (IP) telephone 1200. As shown, the wireless IP telephone 1200 includes an on-chip system 1202 that includes a digital signal processor (DSP) 1204. A display controller 1206 may be coupled to the DSP 1204 and a display 1208 is coupled to the display controller 1206. In an exemplary embodiment, the display 1208 is a liquid crystal display (LCD). FIG. 12 further shows that a keypad 1210 may be coupled to the DSP 1204.

A flash memory 1212 may be coupled to the DSP 1204. A synchronous dynamic random access memory (SDRAM) 1214, a static random access memory (SRAM) 1216, and an electrically erasable programmable read only memory (EEPROM) 1218 may also be coupled to the DSP 1204. The general diagram of FIG. 12 also shows that a light emitting diode (LED) 1220 may be coupled to the DSP 1204. Additionally, in a particular embodiment, a voice CODEC 1222 may be coupled to the DSP 1204. An amplifier 1224 may be coupled to the voice CODEC 1222 and a mono speaker 1226 may be coupled to the amplifier 1224. The general diagram of FIG. 12 further illustrates a mono headset 1228 coupled to the voice CODEC 1222. In a particular embodiment, the mono headset 1228 includes a microphone.

A wireless local area network (WLAN) baseband processor 1230 may be coupled to the DSP 1204. An RF transceiver 1232 may be coupled to the WLAN baseband processor 1230 and an RF antenna 1234 may be coupled to the RF transceiver 1232. In a particular embodiment, a Bluetooth controller 1236 may also be coupled to the DSP 1204 and a Bluetooth antenna 1238 may be coupled to the controller 1236. The general diagram of FIG. 12 also shows that a USB port 1240 may also be coupled to the DSP 1204. Moreover, a power supply 1242 is coupled to the on-chip system 1202 and provides power to the various components of the wireless IP telephone 1200.

As indicated in the general diagram of FIG. 12, the display 1208, the keypad 1210, the LED 1220, the mono speaker 1226, the mono headset 1228, the RF antenna 1234, the Bluetooth antenna 1238, the USB port 1240, and the power supply 1242 may be external to the on-chip system 1202 and coupled to one or more components of the on-chip system 1202. In a particular embodiment, the DSP 1204 includes a dual function adder 1280 to compute both hardware prefetch addresses and arithmetic operation values or both hardware prefetch addresses and load/store addresses, as previously described.

Figure 13:
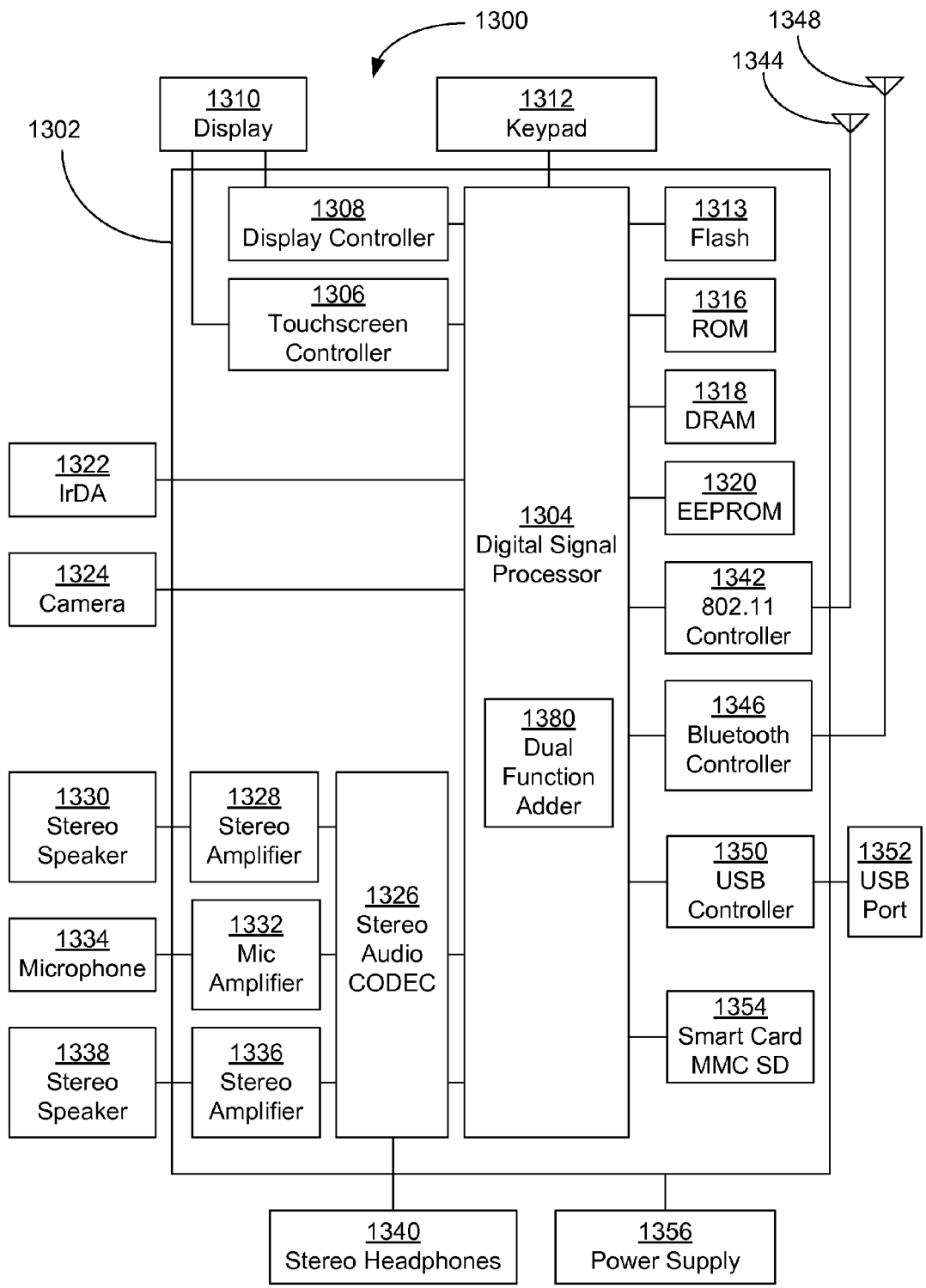
FIG. 13 is a general diagram illustrating an example portable digital assistant incorporating a digital signal processor that may include a dual function adder.

FIG. 13 is a diagram illustrating an exemplary embodiment of a portable digital assistant (PDA) 900. As shown, the PDA 1300 includes an on-chip system 1302 that includes a digital signal processor (DSP) 1304. A touchscreen controller 1306 and a display controller 1308 are coupled to the DSP 1304. Further, a touchscreen display 1310 is coupled to the touchscreen controller 1306 and to the display controller 1308. The general diagram of FIG. 13 also indicates that a keypad 1312 may be coupled to the DSP 1304.

In a particular embodiment, a stereo audio CODEC 1326 may be coupled to the DSP 1304. A first stereo amplifier 1328 may be coupled to the stereo audio CODEC 1326 and a first stereo speaker 1330 may be coupled to the first stereo amplifier 1328. Additionally, a microphone amplifier 1332 may be coupled to the stereo audio CODEC 1326 and a microphone 1334 may be coupled to the microphone amplifier 1332. The general diagram of FIG. 13 further shows that a second stereo amplifier 1336 may be coupled to the stereo audio CODEC 1326 and a second stereo speaker 1338 may be coupled to the second stereo amplifier 1336. In a particular embodiment, stereo headphones 1340 may also be coupled to the stereo audio CODEC 1326.

The general diagram of FIG. 13 also illustrates that an 802.11 controller 1342 may be coupled to the DSP 1304 and an 802.11 antenna 1344 may be coupled to the 802.11 controller 1342. Moreover, a Bluetooth controller 1346 may be coupled to the DSP 1304 and a Bluetooth antenna 1348 may be coupled to the Bluetooth controller 1346. A USB controller 1350 may be coupled to the DSP 1304 and a USB port 1352 may be coupled to the USB controller 1350. Additionally, a smart card 1354, e.g., a multimedia card (MMC) or a secure digital card (SD), may be coupled to the DSP 1304. Further, a power supply 1356 may be coupled to the on-chip system 1302 and may provide power to the various components of the PDA 1300.

As indicated in the general diagram of FIG. 13, the display 1310, the keypad 1312, the IrDA port 1322, the digital camera 1324, the first stereo speaker 1330, the microphone 1334, the second stereo speaker 1338, the stereo headphones 1340, the 802.11 antenna 1344, the Bluetooth antenna 1348, the USB port 1352, and the power supply 1350 may be external to the on-chip system 1302 and coupled to one or more components on the on-chip system. In a particular embodiment, the DSP 1304 includes a dual function adder 1380 to compute both hardware prefetch addresses and arithmetic operation values or both hardware prefetch addresses and load/store addresses, as previously described.

Figure 14:
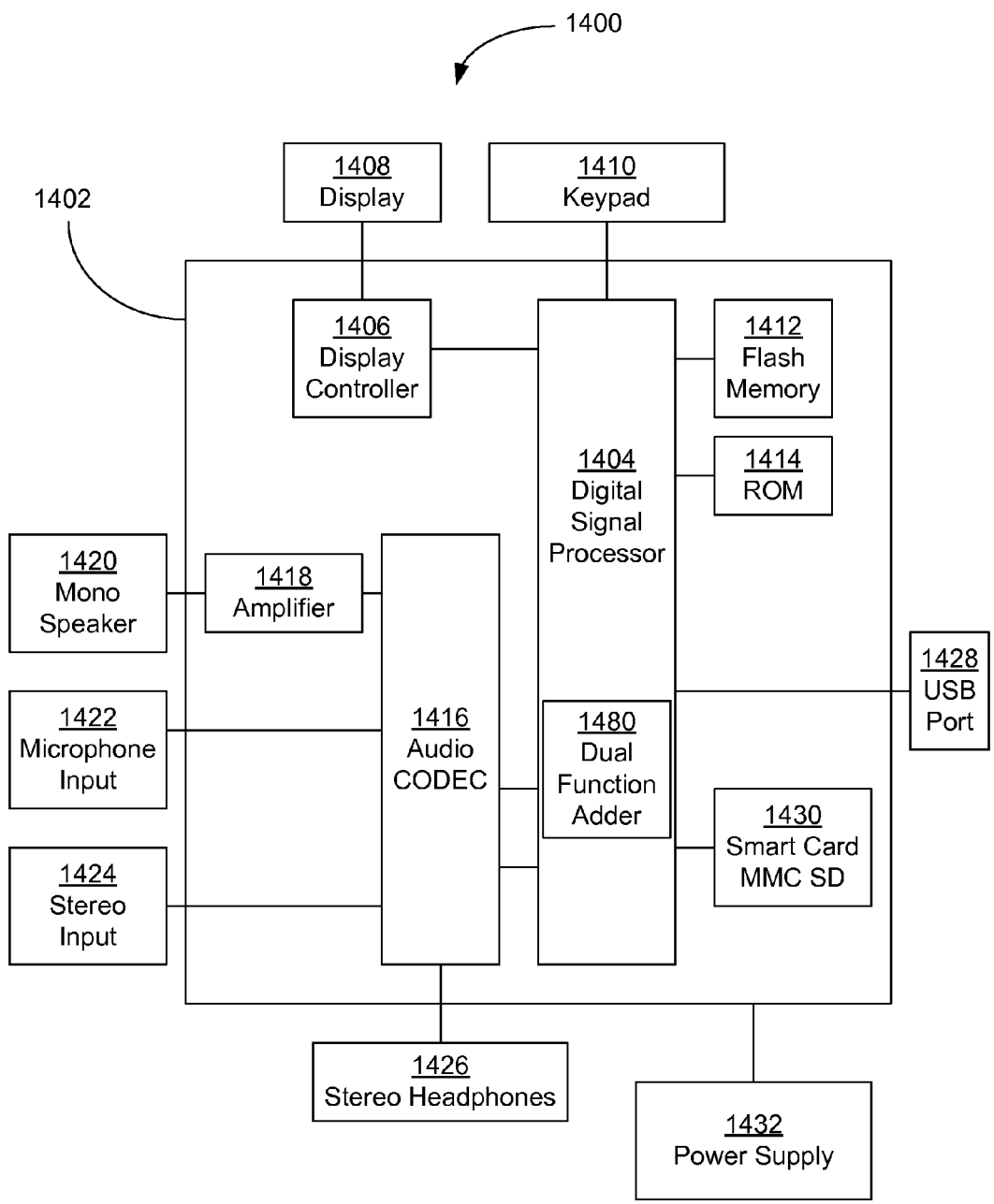
FIG. 14 is a general diagram illustrating an example audio file player incorporating a digital signal processor that may include a dual function adder.

FIG. 14 is a diagram illustrating an exemplary embodiment of an audio file player (e.g., MP3 player) 1400. As shown, the audio file player 1400 includes an on-chip system 1402 that includes a digital signal processor (DSP) 1404. A display controller 1406 may be coupled to the DSP 1404 and a display 1408 is coupled to the display controller 1406. In an exemplary embodiment, the display 1408 is a liquid crystal display (LCD). A keypad 1410 may be coupled to the DSP 1404.

As further depicted in the general diagram of FIG. 14, a flash memory 1412 and a read only memory (ROM) 1414 may be coupled to the DSP 1404. Additionally, in a particular embodiment, an audio CODEC 1416 may be coupled to the DSP 1404. An amplifier 1418 may be coupled to the audio CODEC 1416 and a mono speaker 1420 may be coupled to the amplifier 1418. The general diagram of FIG. 14 further indicates that a microphone input 1422 and a stereo input 1424 may also be coupled to the audio CODEC 1416. In a particular embodiment, stereo headphones 1426 may also be coupled to the audio CODEC 1416.

A USB port 1428 and a smart card 1430 may be coupled to the DSP 1404. Additionally, a power supply 1432 may be coupled to the on-chip system 1402 and may provide power to the various components of the audio file player 1400.

As indicated in the general diagram of FIG. 14, the display 1408, the keypad 1410, the mono speaker 1420, the microphone input 1422, the stereo input 1424, the stereo headphones 1426, the USB port 1428, and the power supply 1432 are external to the on-chip system 1402 and coupled to one or more components on the on-chip system 1402. In a particular embodiment, the DSP 1404 includes a dual function adder 1480 to compute both hardware prefetch addresses and arithmetic operation values or both hardware prefetch addresses and load/store addresses, as previously described.

General

The foregoing description of the embodiments of the inventive concepts disclosed herein has been presented only for the purpose of illustration and description and is not intended to be exhaustive or to limit the inventive concepts disclosed herein to the precise forms disclosed. Numerous modifications and adaptations are apparent to those skilled in the art without departing from the spirit and scope of the inventive concepts disclosed herein.

What is claimed is:

1. A system, comprising:
 a first adder, wherein the first adder is configured to determine an address corresponding to a hardware prefetch in response to receiving a hardware prefetch instruction, and wherein the first adder is further configured to perform an arithmetic operation in response to receiving an arithmetic operation instruction; and
 first control logic configured to select between an output of the first adder, an output of a second adder, and an operand.

2. The system of claim 1, further comprising the second adder communicably coupled to the first adder, wherein the second adder is configured to determine an address corresponding to a load/store operation.

3. The system of claim 2, further comprising second control logic communicably coupled to the first adder and to the first control logic, wherein the second control logic is configured to select from the output of the first adder during a first execution cycle and an output of the first control logic during a second execution cycle.

4. The system of claim 3, further comprising a data cache communicably coupled to the second control logic, wherein the second control logic is further configured to access the data cache using one of the output of the first adder and the output of the first control logic.

5. The system of claim 3, further comprising a register file communicably coupled to the first adder and the second adder, wherein the register file is configured to receive the output of the first adder, to send a memory operand as the operand to the first control logic, and to send an Arithmetic Logic Unit (ALU) operand as the operand to the first control logic.

6. The system of claim 3, integrated in a multithreaded processor.

7. The system of claim 6, further comprising logic to store the output of the second adder during the first execution cycle and during the second execution cycle, wherein the first execution cycle and the second execution cycle are associated with a thread of the multithreaded processor.

8. The system of claim 7, wherein the multithreaded processor is configured to operate the second adder during the first clock cycle, to operate the first control logic during the second clock cycle, and to operate the first adder during a third clock cycle.

9. The system of claim 2, wherein the first control logic is a multiplexer, wherein the output of the first adder is one of the address corresponding to the prefetch instruction and a result of the arithmetic operation, wherein the output of the second adder is the address corresponding to the load/store operation, and wherein the operand is one or more of a memory operand and an Arithmetic Logic Unit (ALU) operand.

10. The system of claim 1, wherein the first adder is further configured to determine a post increment address.

11. The system of claim 10, further comprising a bypass communicably coupled to the second adder, wherein the bypass is configured to send the post increment address output by the first adder during a first execution cycle to an input of the second adder during a second execution cycle.

12. A method, comprising:
determining, by a first adder, an address corresponding to a hardware prefetch in response to receiving a hardware prefetch instruction;
performing, by the first adder, an arithmetic operation in response to receiving an arithmetic operation instruction; and
selecting, at first control logic, between an output of the first adder, an output of a second adder, and an operand.

13. The method of claim 12, further comprising:
determining an address for a load/store operation by the second adder, wherein the second adder is communicably coupled to the first adder;
wherein the output of the first adder is selected during a first execution cycle and the output of the second adder is selected during a second execution cycle.

14. The method of claim 13, further comprising accessing a data cache communicably coupled to second control logic using the output of the first adder or the output of the first control logic.

15. The method of claim 14, further comprising determining a post increment address by the first adder.

16. The method of claim 15, further comprising sending the post increment address output by the first adder during the first execution cycle to an input of the second adder during the second execution cycle.

17. The method of claim 13, further comprising storing a received output from the first adder by a register file communicably coupled to the first adder.

18. A system, comprising:
means for determining an address associated with a hardware prefetch if a first instruction is a hardware prefetch instruction and for determining a value from an arithmetic operation if the first instruction is an arithmetic operation instruction; and
means for selecting between an output of the means for determining an address associated with a hardware prefetch if a first instruction is a hardware prefetch instruction and for determining a value from an arithmetic operation if the first instruction is an arithmetic operation instruction, an output of a second adder, and an operand.

19. The system of claim 18, further comprising the second adder, wherein the second adder comprises means for determining an address associated with a load/store operation.

20. The system of claim 19, further comprising means for accessing a data cache, wherein the means for accessing the data cache is responsive to the means for selecting between the output of the first adder, the output of a second adder, and the operand.

21. The system of claim 19, wherein the means for determining the address associated with the load/store operation further comprises means for determining a post increment address.

22. The system of claim 21, further comprising means for sending the post increment address output by the first adder during a first execution cycle to an input of the second adder during a second execution cycle.

23. A non-transitory computer-readable medium including program code that, when executed by a processor, causes the processor to:
determine an address corresponding to a hardware prefetch in response to receiving a hardware prefetch instruction;
perform an arithmetic operation in response to receiving an arithmetic operation instruction;
select between an output of a first adder operation, an output of a second adder operation, and a first operand, wherein the first adder operation includes determining the address corresponding to the hardware prefetch in response to receiving the hardware prefetch instruction and performing the arithmetic operation in response to receiving the arithmetic operation instruction; and
select between an address, a second operand, and a third operand.

24. The non-transitory computer-readable medium of claim 23, wherein the second adder operation includes determining an address for a load/store operation, and wherein the output of the first adder operation is selected during a first execution cycle and the output of the second adder operation is selected during a second execution cycle.

25. The non-transitory computer-readable medium of claim 24, wherein the program code, when executed by the processor, further causes the processor to access a data cache using the output of the first adder operation or the result of selecting between the output of the first adder operation, the output of the second adder operation, and the first operand.

26. The non-transitory computer-readable medium of claim 25, wherein the first adder operation further includes determining a post increment address.

* * * * *